(12) United States Patent
Kerkes

(10) Patent No.: US 12,393,579 B2
(45) Date of Patent: Aug. 19, 2025

(54) METHODS AND APPARATUS TO IDENTIFY ELECTRONIC DEVICES

(71) Applicant: The Nielsen Company (US), LLC, New York, NY (US)

(72) Inventor: Joseph Kerkes, Lutz, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/886,441

(22) Filed: Aug. 11, 2022

(65) Prior Publication Data
US 2023/0214384 A1 Jul. 6, 2023

Related U.S. Application Data

(60) Provisional application No. 63/266,318, filed on Dec. 31, 2021.

(51) Int. Cl.
G06F 16/245 (2019.01)
H04L 61/4552 (2022.01)

(52) U.S. Cl.
CPC ........ *G06F 16/245* (2019.01); *H04L 61/4552* (2022.05)

(58) Field of Classification Search
CPC ... G06F 16/245; H04L 61/4552; H04L 61/45; H04L 2101/604; H04L 2101/622
See application file for complete search history.

(56) References Cited

U.S. PATENT DOCUMENTS

| | | |
|---|---|---|
| 4,972,503 A | 11/1990 | Zurlinden |
| 5,751,967 A | 5/1998 | Raab et al. |
| 5,958,010 A | 9/1999 | Agarwal et al. |
| 6,442,144 B1 | 8/2002 | Hansen et al. |
| 6,578,021 B1 | 6/2003 | Barillaud |
| 7,180,115 B1 | 2/2007 | Hofmann et al. |
| 7,801,150 B1 | 9/2010 | Rupavatharam |
| 7,885,205 B2 | 2/2011 | Jeansonne et al. |
| 7,904,608 B2 | 3/2011 | Price |

(Continued)

FOREIGN PATENT DOCUMENTS

| | | |
|---|---|---|
| WO | 2001014989 A1 | 3/2001 |
| WO | 2014176171 A1 | 10/2014 |

OTHER PUBLICATIONS

Kljun, "Streaming meter generic solution for proprietary WiFi extenders : A generic solution approach to recognize a metered device connected to the proprietary WiFe extender", The Nielsen Company (US) LLC, Mar. 31, 2020, 7 pages.

(Continued)

*Primary Examiner* — Aleksandr Kerzhner
*Assistant Examiner* — Aryan D Toughiry

(57) ABSTRACT

Methods, apparatus, systems, and articles of manufacture are disclosed to identify devices. An example apparatus to identify devices comprises at least one memory; machine readable instructions; and processor circuitry to at least one of instantiate or execute the machine readable instructions to: determine if a device identification repository includes a first device identifier included in a query; infer first device information for the first device identifier based on a second device identifier and second device information included in the device identification repository; and transmit the first device information in response to the query.

10 Claims, 8 Drawing Sheets

(56) References Cited

U.S. PATENT DOCUMENTS

| | | |
|---|---|---|
| 7,966,428 B2 | 6/2011 | Jalon |
| 7,996,894 B1 | 8/2011 | Chen et al. |
| 8,209,740 B1 | 6/2012 | Kulaga et al. |
| 8,578,468 B1 | 11/2013 | Yadav |
| 8,591,340 B2 | 11/2013 | Robb |
| 8,700,657 B2 | 4/2014 | Frett et al. |
| 8,843,953 B1 | 9/2014 | Dang et al. |
| 9,032,477 B2 | 5/2015 | Ranjan et al. |
| 9,119,070 B2 | 8/2015 | Brindza |
| 9,135,293 B1* | 9/2015 | Kienzle ............... G06F 16/245 |
| 9,560,007 B2 | 1/2017 | Watanabe |
| 9,647,779 B2 | 5/2017 | Besehanic |
| 9,721,073 B2 | 8/2017 | Schröder et al. |
| 10,284,665 B2 | 5/2019 | Besehanic |
| 10,482,890 B2 | 11/2019 | Srinivasan et al. |
| 10,609,166 B2 | 3/2020 | Besehanic |
| 10,938,654 B2 | 3/2021 | Arunachalam et al. |
| 11,019,164 B2 | 5/2021 | Besehanic |
| 11,265,286 B2 | 3/2022 | Mermoud et al. |
| 11,323,317 B1 | 5/2022 | Levin et al. |
| 11,652,899 B2 | 5/2023 | Besehanic |
| 11,652,901 B2 | 5/2023 | Besehanic |
| 11,924,646 B2 | 3/2024 | Singh et al. |
| 2001/0034232 A1 | 10/2001 | Kuwahara |
| 2002/0136268 A1 | 9/2002 | Gan et al. |
| 2002/0198762 A1 | 12/2002 | Donato |
| 2003/0037163 A1 | 2/2003 | Kitada et al. |
| 2004/0040023 A1 | 2/2004 | Ellis et al. |
| 2004/0049586 A1 | 3/2004 | Ocepek et al. |
| 2006/0268744 A1 | 11/2006 | Sakai et al. |
| 2007/0237141 A1 | 10/2007 | Marchese |
| 2008/0133719 A1 | 6/2008 | Amitai et al. |
| 2008/0134165 A1 | 6/2008 | Anderson et al. |
| 2008/0155613 A1 | 6/2008 | Benya et al. |
| 2008/0263579 A1 | 10/2008 | Mears et al. |
| 2008/0281966 A1 | 11/2008 | Jennings, III et al. |
| 2009/0019141 A1 | 1/2009 | Bush et al. |
| 2009/0172443 A1 | 7/2009 | Rothman et al. |
| 2009/0210892 A1 | 8/2009 | Ramaswamy |
| 2009/0232028 A1 | 9/2009 | Baalbergen et al. |
| 2009/0235244 A1 | 9/2009 | Enomori et al. |
| 2009/0323634 A1 | 12/2009 | Kim et al. |
| 2010/0106769 A1 | 4/2010 | Blanchard et al. |
| 2010/0115543 A1 | 5/2010 | Falcon |
| 2010/0228625 A1 | 9/2010 | Priyadarshan et al. |
| 2010/0242095 A1 | 9/2010 | Mendenhall |
| 2010/0248627 A1 | 9/2010 | S et al. |
| 2010/0309912 A1 | 12/2010 | Mehta et al. |
| 2010/0321647 A1* | 12/2010 | Schuler ............... G06F 1/3265 |
| | | 715/764 |
| 2011/0013806 A1 | 1/2011 | Zuev et al. |
| 2011/0019673 A1 | 1/2011 | Fernández Gutiérrez |
| 2011/0055928 A1 | 3/2011 | Brindza |
| 2011/0067119 A1 | 3/2011 | Baum |
| 2011/0077043 A1 | 3/2011 | Aoyagi et al. |
| 2011/0113455 A1 | 5/2011 | Wu |
| 2011/0138064 A1 | 6/2011 | Rieger et al. |
| 2011/0149960 A1 | 6/2011 | Fernández Gutiérrez |
| 2011/0213863 A1 | 9/2011 | Shah et al. |
| 2011/0241821 A1 | 10/2011 | Jalon |
| 2012/0011559 A1 | 1/2012 | Miettinen et al. |
| 2012/0026999 A1 | 2/2012 | Choi et al. |
| 2012/0036220 A1 | 2/2012 | Dare et al. |
| 2012/0036552 A1 | 2/2012 | Dare et al. |
| 2012/0042005 A1 | 2/2012 | Papakostas et al. |
| 2012/0060228 A1 | 3/2012 | Katkar |
| 2012/0093508 A1 | 4/2012 | Baykal et al. |
| 2012/0131157 A1 | 5/2012 | Gospodarek et al. |
| 2012/0173701 A1 | 7/2012 | Tenbrock |
| 2012/0174088 A1 | 7/2012 | Jung et al. |
| 2012/0185910 A1 | 7/2012 | Miettinen et al. |
| 2012/0221716 A1 | 8/2012 | Halevi et al. |
| 2013/0005296 A1 | 1/2013 | Papakostas et al. |
| 2013/0006435 A1 | 1/2013 | Berrios et al. |
| 2013/0007236 A1 | 1/2013 | Besehanic |
| 2013/0046651 A1 | 2/2013 | Edson |
| 2013/0061243 A1 | 3/2013 | Pillers |
| 2013/0070639 A1 | 3/2013 | Demura et al. |
| 2013/0111013 A1 | 5/2013 | Besehanic |
| 2013/0128751 A1 | 5/2013 | Keesara et al. |
| 2013/0132152 A1 | 5/2013 | Srivastava et al. |
| 2013/0137451 A1 | 5/2013 | Meredith et al. |
| 2013/0150002 A1 | 6/2013 | Croy et al. |
| 2013/0212200 A1 | 8/2013 | Dennis et al. |
| 2013/0232251 A1 | 9/2013 | Pauley |
| 2013/0244579 A1 | 9/2013 | Hohteri et al. |
| 2013/0308641 A1 | 11/2013 | Ackley |
| 2014/0003286 A1 | 1/2014 | Estevez et al. |
| 2014/0122715 A1 | 5/2014 | Rowe |
| 2014/0157298 A1 | 6/2014 | Murphy |
| 2014/0237498 A1 | 8/2014 | Ivins |
| 2014/0244828 A1 | 8/2014 | Besehanic |
| 2014/0287682 A1 | 9/2014 | Minemura et al. |
| 2014/0317114 A1* | 10/2014 | Alla .................... H04N 21/251 |
| | | 707/769 |
| 2014/0317270 A1 | 10/2014 | Besehanic |
| 2015/0063233 A1 | 3/2015 | Choi et al. |
| 2015/0085775 A1 | 3/2015 | Choi et al. |
| 2015/0089032 A1 | 3/2015 | Agarwal et al. |
| 2015/0121540 A1 | 4/2015 | Citron et al. |
| 2015/0207667 A1 | 7/2015 | Basso et al. |
| 2015/0222939 A1 | 8/2015 | Gallant et al. |
| 2015/0277856 A1 | 10/2015 | Payne et al. |
| 2015/0327052 A1 | 11/2015 | Ghai |
| 2015/0334523 A1 | 11/2015 | Lappetelainen et al. |
| 2016/0174006 A1* | 6/2016 | Lee ...................... H04R 3/12 |
| | | 381/77 |
| 2016/0254946 A1 | 9/2016 | Prevost et al. |
| 2017/0041410 A1 | 2/2017 | Bosworth et al. |
| 2017/0060918 A1 | 3/2017 | Iyer et al. |
| 2017/0195294 A1 | 7/2017 | Branca |
| 2017/0244797 A1 | 8/2017 | Besehanic |
| 2017/0280266 A1 | 9/2017 | Brisebois |
| 2017/0288965 A1 | 10/2017 | Cebere |
| 2018/0048534 A1 | 2/2018 | Banga et al. |
| 2018/0124009 A1 | 5/2018 | Kerkes et al. |
| 2018/0167473 A1 | 6/2018 | Gierada |
| 2018/0307472 A1 | 10/2018 | Paul et al. |
| 2019/0058907 A1* | 2/2019 | Schenker ............ H04N 21/6582 |
| 2019/0132625 A1 | 5/2019 | Matsunaga et al. |
| 2019/0245785 A1 | 8/2019 | Haapanen et al. |
| 2019/0260842 A1 | 8/2019 | Besehanic |
| 2020/0076896 A1 | 3/2020 | Anumala et al. |
| 2020/0125355 A1 | 4/2020 | Aust |
| 2020/0133654 A1 | 4/2020 | Lei et al. |
| 2020/0153735 A1 | 5/2020 | Du et al. |
| 2020/0155045 A1 | 5/2020 | Sharrock |
| 2020/0169528 A1 | 5/2020 | Le et al. |
| 2020/0186885 A1 | 6/2020 | Menand et al. |
| 2020/0213352 A1 | 7/2020 | Fainberg et al. |
| 2020/0228615 A1 | 7/2020 | Besehanic |
| 2020/0252239 A1 | 8/2020 | Lee et al. |
| 2021/0011705 A1 | 1/2021 | Liu et al. |
| 2021/0136084 A1 | 5/2021 | Dayan |
| 2021/0243603 A1 | 8/2021 | Yin et al. |
| 2021/0266258 A1 | 8/2021 | Sheu et al. |
| 2021/0281516 A1 | 9/2021 | Hatta et al. |
| 2021/0281652 A1 | 9/2021 | Besehanic |
| 2021/0303636 A1* | 9/2021 | Dua .................... G06F 16/9038 |
| 2021/0306296 A1 | 9/2021 | Livoti |
| 2021/0365445 A1* | 11/2021 | Robell .................. G06F 16/90 |
| 2023/0146079 A1* | 5/2023 | Jeng ................... H04L 61/106 |
| | | 726/26 |
| 2023/0214384 A1 | 7/2023 | Kerkes |
| 2023/0231929 A1 | 7/2023 | Besehanic |

OTHER PUBLICATIONS

International Search Report and Written Opinion, issued in connection with International Application No. PCT/US2014/034820, dated Aug. 14, 2014, 9 pages.

(56) References Cited

OTHER PUBLICATIONS

John A et al., MAC Address and OUI Lookup, arul's utilies, Retrieved from URL: https://aruljohn.com/mac.pl, May 22, 2019, 5 Pages.

Nielsen gets rid of its offensively outdated Diary that Logged TV Habits, The HUSTLE, Sep. 15, 2016, 05 Pages.

Nielsen will close the chapter on paper diaries for TV ratings by early 2018, Tampa Bay Times, Sep. 15, 2016, 07 Pages.

*The Nielsen Company (US), LLV v. HyphaMetrics, Inc.,* Case No. 23-00136, Complaint for Patent Infringement, May 17, 2023, 20 pages.

*The Nielsen Company (US), LLV v. HyphaMetrics, Inc.,* Case No. 23-136-GBW, Exhibit B, Invalidity of U.S. Pat. No. 11,652,901, Oct. 31, 2023, 19 pages.

*The Nielsen Company (US), LLV v. HyphaMetrics, Inc.,* Case No. 23-532-GBW, Defendant's Initial Invalidity Contentions, Oct. 31, 2023, 31 pages.

United States Patent and Trademark Office, Final Office Action, issued in connection with U.S. Appl. No. 13/931,750, dated Jan. 26, 2016, 11 pages.

United States Patent and Trademark Office, Final Office Action, issued in connection with U.S. Appl. No. 13/931,750, dated Sep. 15, 2016, 14 pages.

United States Patent and Trademark Office, Non-Final Office Action, issued in connection with U.S. Appl. No. 13/931,750, dated Mar. 24, 2016, 18 pages.

United States Patent and Trademark Office, Non-Final Office Action, issued in connection with U.S. Appl. No. 13/931,750, dated Jul. 1, 2015, 10 pages.

United States Patent and Trademark Office, Non-Final Office Action, issued in connection with U.S. Appl. No. 15/588,245, dated Aug. 29, 2018, 16 pages.

United States Patent and Trademark Office, Non-Final Office Action, issued in connection with U.S. Appl. No. 16/404,366, dated Aug. 23, 2019, 4 pages.

United States Patent and Trademark Office, Non-Final Office Action, issued in connection with U.S. Appl. No. 16/834,842, dated Oct. 8, 2020, 6 pages.

United States Patent and Trademark Office, Non-Final Office Action, issued in connection with U.S. Appl. No. 17/328,860, dated Oct. 6, 2022, 5 pages.

United States Patent and Trademark Office, Non-Final Office Action, issued in connection with U.S. Appl. No. 17/956,450, dated Dec. 9, 2022, 13 pages.

*The Nielsen Company (US), LLC v. HyphaMetrics, Inc.,* Case No. 23-136-GBW-CJB, HyphaMetrics, Inc.'s Opening Brief in Support of Motion for Summary Judgment, Mar. 10, 2025, 21 pages.

*The Nielsen Company (US), LLC v. HyphaMetrics, Inc.,* Case No. 23-136-GBW-CJB, Exhibit A3 accompanying HyphaMetrics'Final Invalidity Contentions, Oct. 9, 2024, 18 pages.

*The Nielsen Company (US), LLC v. HyphaMetrics, Inc.,* Case No. 23-136-GBW-CJB, Exhibit AI accompanying HyphaMetrics Final Invalidity Contentions, Oct. 9, 2024, 28 pages.

*The Nielsen Company (US), LLC v. HyphaMetrics, Inc.,* Case No. 23-136-GBW-CJB, HyphaMetrics' Final Invalidity Contentions, Oct. 9, 2024, 9 pages.

United States Patent and Trademark Office, Non-Final office action, issued in connection with U.S. Appl. No. 18/648,868, mailed on Nov. 15, 2024, 6 pages.

*The Nielsen Company (US), LLC v. HyphaMetrics, Inc.,* Defendant's Responsive to Plaintiff's Sur-Reply Addressing the Recently Decided Recentive Analytics Case, C.A. No. 23-136-GBW-CJB, dated May 9, 2025, 3 Pages.

*The Nielsen Company (US), LLC. v. Hyphametrics, Inc.,* Plaintiff's Sur-reply Brief Opposing Defendant's Motions for Summary Judgment, C.A. No 23-136-GBW-CJB, dated May 6, 2025, 10 Pages.

*The Nielsen Company (US), LLC v. HyphaMetrics, Inc., Hyphametrics, Inc.'s* Reply Brief in Support of Its Motion for Summary Judgment, C.A. No. 23-136-GBW-CJB, dated Apr. 28, 2025, 21 Pages.

*The Nielsen Company (US), LLC v. Hyphametrics, Inc.,* Plaintiff's Answering Brief Opposing Defendant's Motions for Summary Judgment, C.A. No. 23-136-GBW-CJB, dated Apr. 14, 2025, 52 Pages.

\* cited by examiner

METHODS AND APPARATUS TO IDENTIFY ELECTRONIC DEVICES

RELATED APPLICATION

This patent claims the benefit of U.S. Provisional Patent Application No. 63/266,318, which was filed on Dec. 31, 2021. U.S. Provisional Patent Application No. 63/266,318 is hereby incorporated herein by reference in its entirety. Priority to U.S. Provisional Patent Application No. 63/266,318 is hereby claimed.

FIELD OF THE DISCLOSURE

This disclosure relates generally to electronic devices and, more particularly, to methods and apparatus to identify electronic devices.

BACKGROUND

Electronic devices are frequently associated with unique or semi-unique identification values. For example, many electronic devices are associated with a media access control (MAC) address that is sometimes referred to as a hardware or physical address.

BRIEF DESCRIPTION OF THE DRAWINGS

In general, the same reference numbers will be used throughout the drawing(s) and accompanying written description to refer to the same or like parts. The figures are not to scale.

Figure 1:
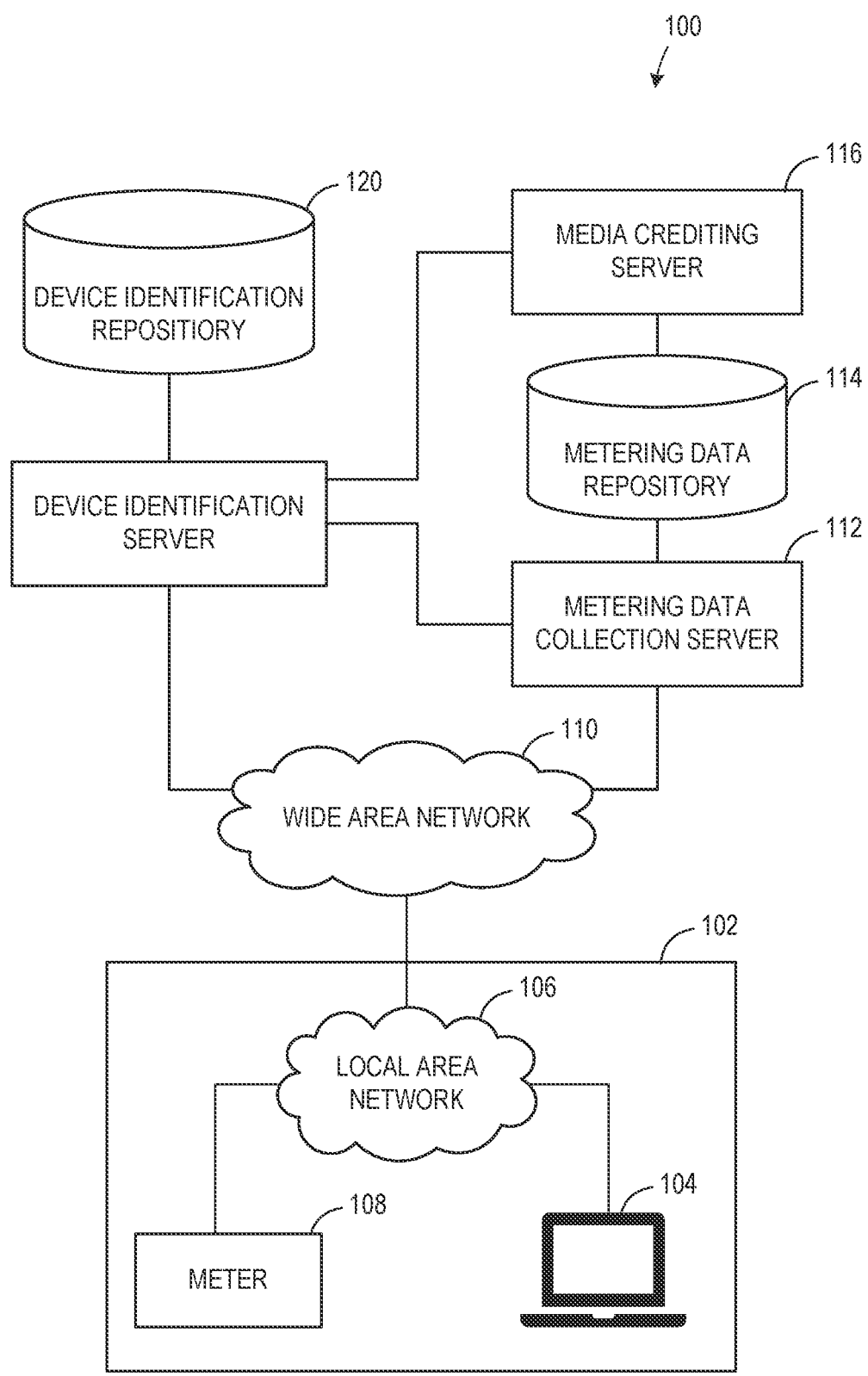
FIG. 1 is a block diagram of an example environment in which device identification information may be determined.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to any timing between real time and real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Device identification information such as a MAC address may be associated with electronic device information. For example, a MAC address comprises 48 bits grouped as 6 octets. Each value for the first 3 octets (24 bits) (known as an Organizationally Unique Identifier) is assigned by the Institute of Electrical and Electronics Engineers (IEEE) to a manufacturer. Thus, the manufacturer of an electronic device may be determined from a MAC address. The last 3 octets (24 bits) of the MAC address are created and assigned by the manufacturer. Accordingly, without the records of a manufacturer, it may not be possible to identify the details of an electronic device based on the MAC address (e.g., device model, version, type, etc.).

Methods and apparatus disclosed herein facilitate identification of device information based on device identification information. Methods and apparatus disclosed herein may be utilized to determine device information (e.g., device manufacturer, device model information, device version information, device capability information, category of device (e.g., media presentation device, data processing device, media transmitting device, media storage device, mobile phone, computer, etc.) even when detailed records for the particular device have not been identified and/or stored. For example, the methods and apparatus disclosed herein may interpolate, estimate, predict, etc. device information for a particular device identification based on device information for devices for which device identification information is known. For example, known device identification information may be collected in the course of operation of a media monitoring system, may be collected from device manufacturer provided information, may be collected from surveys, etc.

An example environment 100 in which one or more media presentation locations 102 may be monitored and device identification may be collected, analyzed, and distributed by an example device identification server 118 is illustrated in FIG. 1. The example environment 100 includes the example media presentation locations 102, an example wide area network 110, an example metering data collection server 112, an example metering data repository 114, an example media crediting server 116, the example device identification server 118, and an example device identification repository 118.

The example media presentation locations 102 may be any type(s) of locations such as, for example, a household, a business, a restaurant, etc. The example media presentation location 102 includes an example media presentation device 104, an example local area network 106, and an example meter 108. While the example media presentation location 102 includes one of each example component, any number and type of components may be included in a media presentation location.

The example media presentation device 104 is a computer on which media may be streamed from a streaming media provider. Alternatively, the media presentation device 104 may be any type of media presentation device such as a television (e.g., a smart television), a laptop computer, a desktop computer, a server, a mobile phone, a streaming device (e.g., a streaming stick, an over-the-top streaming device, etc.), etc. According to the illustrated example, the media presentation device 104 is coupled to the example local area network 106 and communicates with other devices using a MAC address as the device identification information. Alternatively, any other type of device information may be utilized and/or device information may be collected in other manners (e.g., may be collected from a device by a human, may be collected by an image capture device collecting an image of the device that includes the device information, etc.).

The example local area network 106 communicatively couples devices within the media presentation location 102 and communicatively couples such devices to the example wide area network 110. The example local area network 106 includes a mix of wireless network components and wired network components. Alternatively, any other type(s) and combination(s) of networks may be utilized. The example network 106 may include any number of devices not shown (e.g., routers, switches, hubs, firewalls, etc.).

The example meter 108 monitors communications within the local area network to collect data to be used for monitoring media access. For example, the meter 108 may be supplied to the media presentation location 102 by an audience measurement entity (e.g., an audience measurement entity that manages the metering collection server 112, the metering data repository 114, and/or the media crediting server 116). The example meter 108 captures network communications (e.g., wireless network communications) and transmits information about the captured network communications to the meter data collection server 112. Alternatively, the meter 108 may collect data in other manners (e.g., capturing audio, video, data, etc. from a media presentation device).

The example meter 108 captures MAC addresses from the media presentation device(s) 104 for use in determining an identity of the media presentation device(s). Alternatively, any other type of device identification information may be captured. During setup of the of the meter 108 at the media presentation location 102, device identification information and device information may be collected and provided to the device identification server 118 for storage in the device identification repository 120.

The example wide area network 110 is the Internet. Alternatively, the wide area network 110 may be any combination of wide area networks and/or local area networks that communicatively couple the media presentation location 102 with the metering data collection server 112 and the device identification server 118. Additionally, the wide area network 110 may include additional devices and systems such as media content providers.

The example metering data collection server 112 is a server computer that receives and/or collects media monitoring data from the meter 108 of the media presentation location 102. The metering data collection server 112 stores the monitoring data in the example metering data repository 114. The metering data collection server 112 may be any combination of computers, network components, storage devices, etc.

The example metering data repository 114 is a database for storing media monitoring data. Alternatively, the metering data repository 114 may be any type of storage device and/or may be integrated with the metering data collection server 112 and/or the media crediting server 116.

The example media crediting server 116 is a server computer that analyzes the media monitoring data stored in the metering data repository 114 to credit media programs, advertisements, media providers, etc. with presentations of the media. For example, the media crediting server 116 may generate reports regarding what media is presented. The reports may include indications of the type of device on which media was presented.

The device identification server 118 is a server computer that collects information correlating device information and device identification information and responds to queries for device information (e.g., requests that include one or more device identifiers). The device identification server 118 is described in further detail in conjunction with FIG. 2.

The device identification repository 120 is a database that stores device identification information associated with device information. Alternatively, the device identification repository may be any other type of storage. In some examples, the device identification repository 120 may be integrated with the device identification server 118.

In operation of the environment 100 of FIG. 1, the media presentation device 104 presents media while the meter 108 collects media monitoring data and transmits the monitoring data to the example metering data collection server 112. During the setup/installation of the meter 108 at the media presentation location 102, device identification information and device information (e.g., device MAC address) about the media presentation (e.g., identification of device manufacturer, identification of device model, identification of device version, etc.). In addition, the device identification server 118 collects device identification and device information from other sources (e.g., manufacturers may provide information to the device identification server 118 and/or may make information publicly available, information may be collected from surveys of device owners, etc.).

While the device identification repository 120 will become populated with numerous associations of device identification and device information, due to the large number of devices in existence, the device identification server 118 will likely receive requests for device information that include device identification information (e.g., a MAC address) that is not stored in the device identification repository 120. Accordingly, when receiving such a request, the device identification server 118 infers, estimates, etc. the device information based on device information contained in the device identification repository 120. For example, the device identification server 118 may infer the requested device information based on device information based on one or more device identifiers that are similar (e.g., numerically closest, matching some aspects, etc.). Queries for device information may be sent by one or more of the meter 108, the metering data collection server 112, the media crediting server 116, or any other device.

Figure 2:
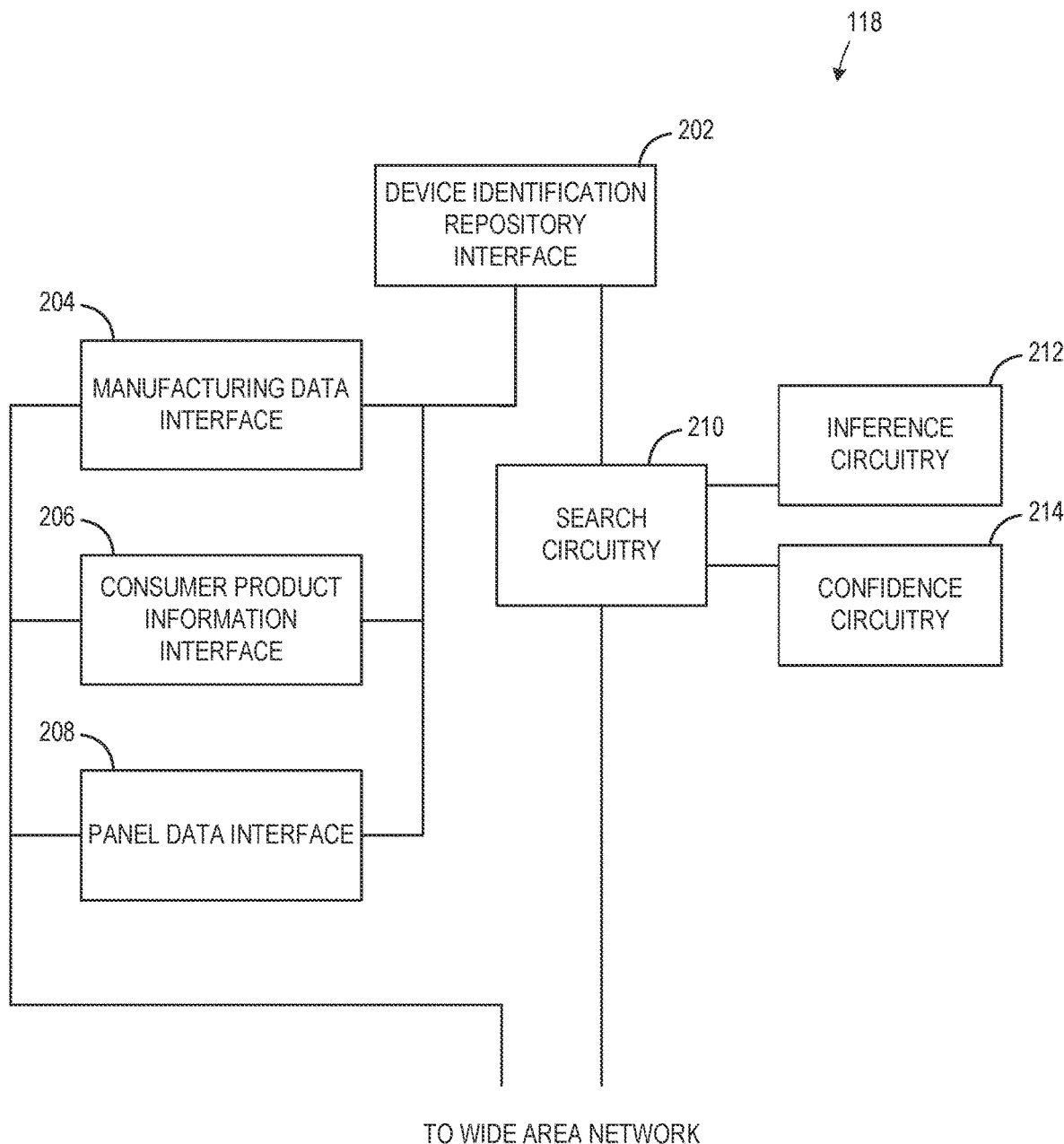
FIG. 2 is a block diagram of an example implementation of the device identification server of FIG. 1.

FIG. 2 is a block diagram of an example implementation of the device identification server 118 of FIG. 1. The example device identification server 118 includes an example device identification repository interface 202, an example manufacturing data interface 204, an example consumer product information interface 206, an example panel data interface 208, an example search circuitry 210, an example inference circuitry 212, and an example confidence circuitry 214.

The device identification server 118 of FIG. 2 may be instantiated (e.g., creating an instance of, bring into being for any length of time, materialize, implement, etc.) by processor circuitry such as a central processing unit executing instructions. Additionally or alternatively, the device identification server 118 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

The example device identification repository interface 202 is a network interface coupling the device identification server 118 to the device identification repository 120. Alternatively, the device identification repository interface 202 may be any other type of interface such as an application programming interface (API), an API access, etc. The deice identification repository interface 202 facilitates communication between the device identification server 118 and the device identification repository 120.

The manufacturing data interface 204, the consumer product information interface 206, and the example panel data interface 208 are web APIs for receiving data. For example, the interfaces 204, 206, and 208 may be backend web APIs that may include frontend webpages that may be accessed by a human or computer. The example manufacturing data interface 204 receives, obtains, and/or collects device identification information and device information from device manufacturers (e.g., MAC addresses associated with device details). The example consumer product information interface 206 obtains device information and device identification information from consumers (e.g., via surveys). The example panel data interface 208 collects device information and device identification information from registration information for panelists that have the example meter 108 installed at the media presentation location 102 (e.g., information collected during the setup and registration of the panelist). The device information and associated device identification information is stored in the device identification repository interface 120 via the device identification repository interface 202. This collected information facilitates the building of a database of device information that can be used to infer information about devices not contained in the device identification repository 120.

The search circuitry 210 receives requests/queries that include device identification information and request device information. For example, such requests may be received from the metering data collection server 112 (e.g., the metering data collection server 112 may request device information for an unknown media presentation device for which metering data has been collected and includes device identification information). The information may assist in detecting faults during metering data collection and analysis (e.g., detecting that media metering data has been received from devices that are not recognized for the media presentation location and/or devices that should not be expected to present media). Such faults may trigger an alert to an audience measurement entity managing the metering and/or to a representative for the media presentation location so that they may investigate and correct the fault. Requests may be received from a representative handling installation of the meter 108 at the media presentation location 102 (e.g., the representative may provide one or more device identifiers to receive device information that can be utilized to register device, locate devices within the media presentation location, etc.). Requests may be received from the media crediting server 116. For example, the media crediting server 116 may request device information for devices for which device identification information is stored in the metering data repository 114 to assist in crediting (e.g., the ability to label metering information based on device type, device class, etc.).

The example search circuitry 210 responds to received requests/queries with device information. For example, the device information may be device information that is retrieved from the device identification repository 120 in connection with device identification information received with the request/query and/or may be device information that is inferred based on the device identification information (e.g., may be inferred when the device identification information is not actually stored in the device identification repository 120). When the device identification information is not included in the device identification repository 120, the search circuitry 210 obtains inferred device information from the inference circuitry 212.

Figure 5:
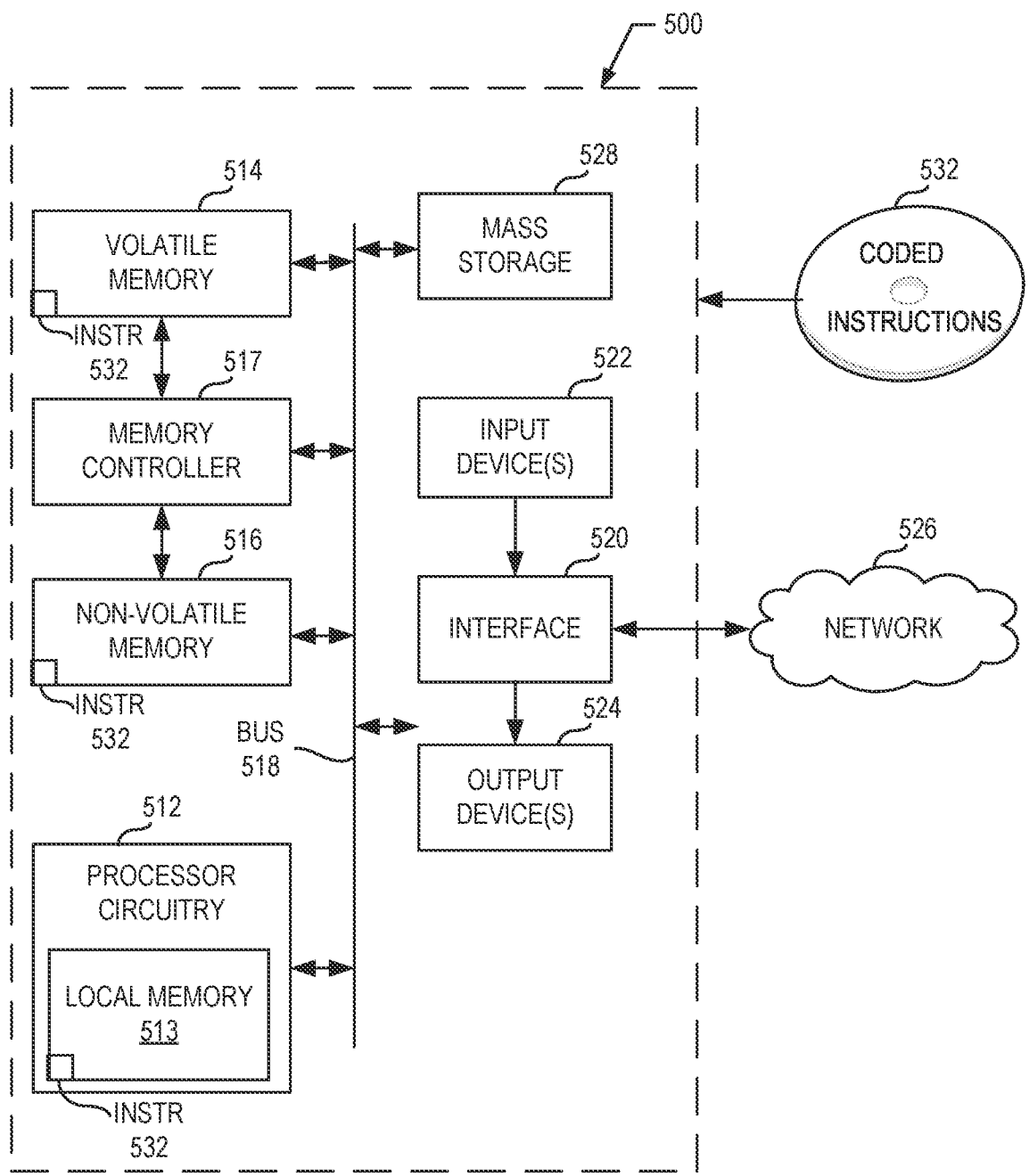
FIG. 5 is a block diagram of an example processing platform including processor circuitry structured to execute the example machine readable instructions and/or the example operations of FIGS. 3-4 to implement the device identification server of FIG. 2.

The example inference circuitry 212 receives device identification information from the search circuitry (e.g., device identification information that was not found in the device identification repository 120) and infers device information based on other device identification information that is included in the device identification repository 120. For example, the inference circuitry 212 may infer device information for a first device identification information based on other device identification information that is close (e.g., numerically closest, neighboring, surrounding, etc.) to the first device identification information. An example flowchart for implementing an example process for inferring device information is illustrated in FIG. 5.

The example confidence circuitry 214 determines a confidence value associated with query results of the search circuitry 210. For example, the confidence value may be from a numerical range (e.g., 0 to 100) to indicate a level of confidence that the query results report the correct device information. For example, if device information included in the query results are based on a record of the device identification information that is included in the device identification repository 120, the confidence value is high (e.g., 100). Alternatively, if the device identification information is inferred, the confidence value may be scaled based on how close device identification information in the device identification repository 120 is to the device identification information included in the request.

While an example manner of implementing the device identification server 118 of FIG. 1 is illustrated in FIG. 2, one or more of the elements, processes, and/or devices illustrated in FIG. 2 may be combined, divided, re-arranged, omitted, eliminated, and/or implemented in any other way. Further, the example device identification repository interface 202, the example manufacturing data interface 204, the example consumer product information interface 206, the example panel data interface 208, the example search circuitry 210, the example inference circuitry 212, the example confidence circuitry 214 and/or, more generally, the example device identification server 118 of FIG. 1, may be implemented by hardware alone or by hardware in combination with software and/or firmware. Thus, for example, any of the example device identification repository interface 202, the example manufacturing data interface 204, the example consumer product information interface 206, the example panel data interface 208, the example search circuitry 210, the example inference circuitry 212, the example confidence circuitry 214 and/or, more generally, the example device identification server 118 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example device identification server 118 of FIG. 1 may include one or more elements, processes, and/or devices in addition to, or instead of, those illustrated in FIG. 2, and/or may include more than one of any or all of the illustrated elements, processes and devices.

Figure 3:
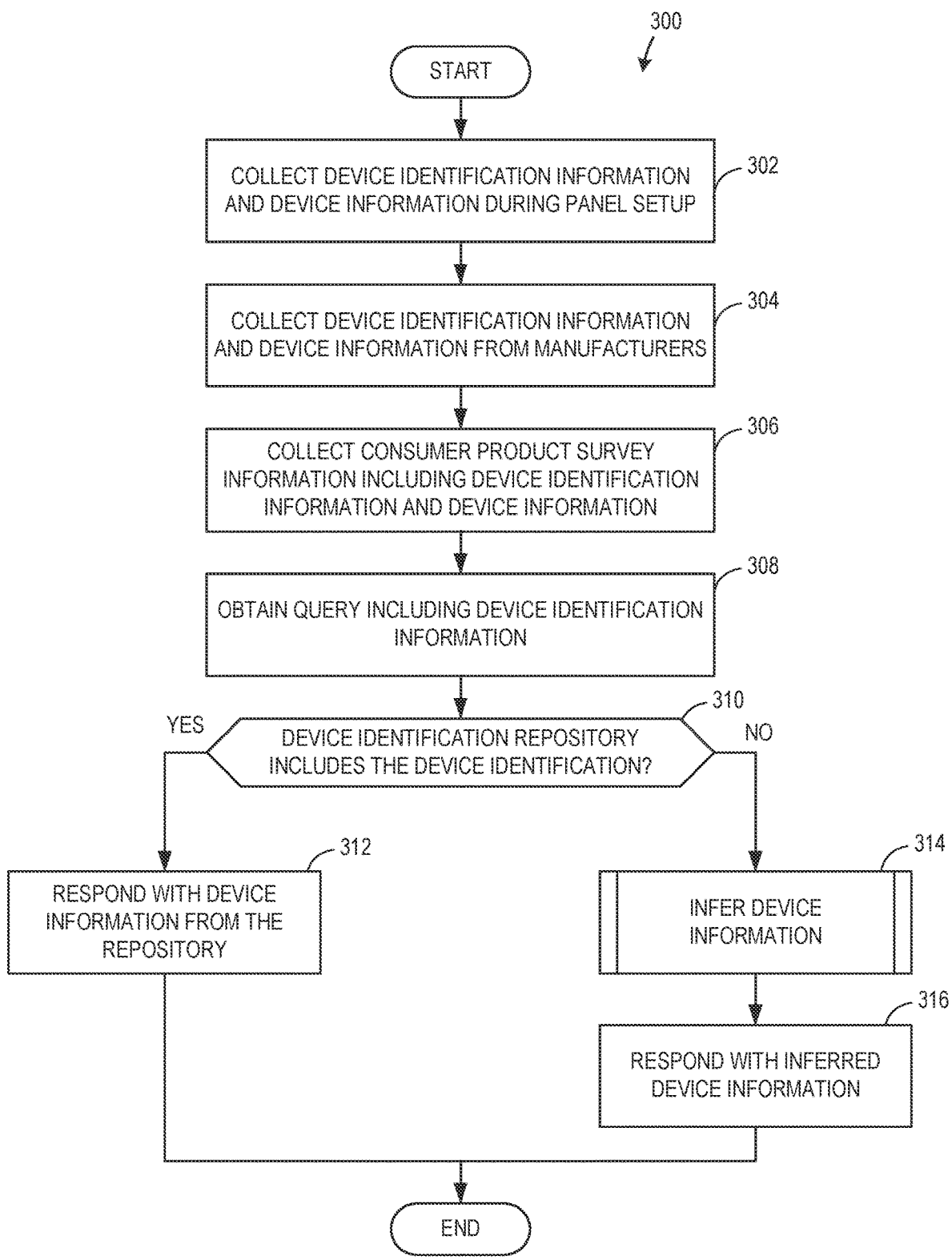
FIGS. 3-4 are flowcharts representative of example machine readable instructions and/or example operations that may be executed by example processor circuitry to implement the device identification server of FIG. 2.
Figure 4:
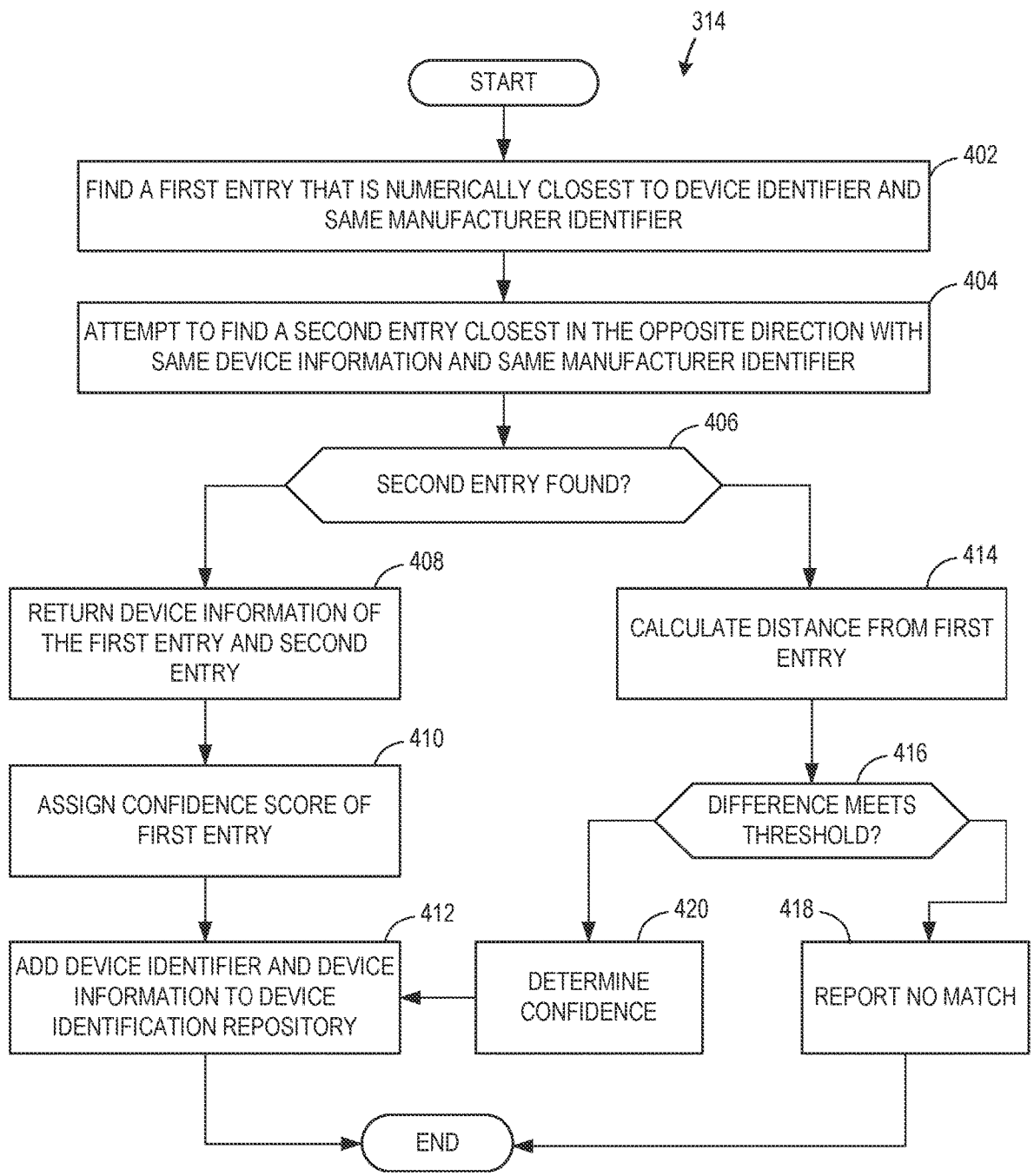

Flowcharts representative of example machine readable instructions, which may be executed to configure processor circuitry to implement the device identification server 118 of FIGS. 1 and/or 2, are shown in FIGS. 3-4. The machine readable instructions may be one or more executable programs or portion(s) of an executable program for execution by processor circuitry, such as the processor circuitry 512 shown in the example processor platform 500 discussed below in connection with FIG. 5 and/or the example processor circuitry discussed below in connection with FIGS. 6 and/or 7. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 3-4, many other methods of implementing the example device identification server 118 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3-4 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions and/or example operations 300 that may be executed and/or instantiated by processor circuitry to respond to queries of device information. The machine readable instructions and/or the operations 300 of FIG. 3 begin at block 302, at which the panel data interface 208 collects device identification information and device information during panel setup and stores the information in the device identification repository 120 via the device identification repository interface 202. The example manufacturing data interface 204 collects device identification information and device information from device manufacturers and stores the information in the device identification repository 120 via the device identification repository interface 202 (block 304). The example consumer product information interface 206 collects device identification information and device information from device manufacturers and stores the information in the device identification repository 120 via the device identification repository interface 202 (block 306). For example, the information stored in blocks 302-306 is stored in the device identification repository 120 with a high confidence value (e.g., 100) because the information is from a definite source.

While a specific order of blocks 302-306 is illustrated, the blocks 302-306 may be operated in any order and any repetition over time.

The example search circuitry 210 obtains a query including device identification information (block 308). The example search circuitry 210 determines if the device identification repository 120 includes the device identification information included in the query (block 310). If the device identification repository 120 includes the device identification information, the search circuitry 210 with device information from the device identification repository 120 (block 312). The example response includes device information (e.g., model number, manufacturer, or any other information included in the device identification repository 120) as well as a confidence value from the device identification repository 120.

If the device identification repository 120 does not include the device identification information (block 314), the inference circuitry 212 infers device information for the device identification information (block 316). An example process for inferring device identification information is described in conjunction with FIG. 5. The search circuitry 210 responds with the inferred device information as well as a confidence value determined by the confidence circuitry 214 (block 316).

FIG. 4 is a flowchart representative of example machine readable instructions and/or example operations to implement block 118 that may be executed and/or instantiated by processor circuitry to respond to queries of device information. The machine readable instructions and/or the operations 400 of FIG. 4 begin at block 402, at which the search circuitry 210 finds a first entry in the device identification repository 120 that is numerically closest to the device identification information included in the request and includes a matching manufacturer identifier (e.g., first three octets of the MAC address). This process assumes that the device identification repository 120 includes at least one device identifier with a matching manufacturer identifier. If such a match was not found, an error or empty result could be returned.

The search circuitry 210 then attempts to find a second entry in the device identification repository 120 closest in the opposite direction of the first entry and including a same device information and manufacturer identifier (block 404). The inference circuitry 212 determines if a second entry was found (block 406). If the second entry was found, the inference circuitry 212 infers that the device information matches the device information of the first and second entry and returns the device information to the search circuitry 210 (block 408). The confidence circuitry 214 determines a confidence score for the query result as the confidence score assigned to the first (closest) entry (block 410). The search circuitry 212 adds the device information in association with the device identifier from the query and the confidence score to the device identification repository 120 (block 412).

Returning to block 406, if a second entry is not found, the inference circuitry 212 calculates a distance between the device identifier in the query and the first entry (block 414). The inference circuitry 212 determines if the difference meets a threshold (block 416). For example, when analyzing MAC addresses as the device identification information, the threshold may be 100,000. If the difference does not meet the threshold (e.g., the distance is greater than the threshold), the inference circuitry reports to the search circuitry 210 that a match could not be inferred (block 418). If the difference meets the threshold (e.g., the difference is less than or equal to the threshold), the confidence circuitry 214 determines a confidence value based on the distance (block 420). According to the illustrated example, if the distance is greater than 10,000 and less than 100,000, the confidence value is 50 and if the distance is less than 10,000, the confidence value is 90. Accordingly, the confidence value may be determined based on (e.g., inversely) to the distance such that the confidence value is lower the greater the distance. Control then returns to block 412 to add the identified device information and confidence value to the device identification repository 120.

FIG. 5 is a block diagram of an example processor platform 500 structured to execute and/or instantiate the machine readable instructions and/or the operations of FIGS. 3-4 to implement the device identification server 118 of FIG. 1 and/or FIG. 2. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 500 of the illustrated example includes processor circuitry 512. The processor circuitry 512 of the illustrated example is hardware. For example, the processor circuitry 512 can be implemented by one or more integrated circuits, logic circuits, FPGAs, microprocessors, CPUs, GPUs, DSPs, and/or microcontrollers from any desired family or manufacturer. The processor circuitry 512 may be implemented by one or more semiconductor based (e.g., silicon based) devices. In this example, the processor circuitry 512 implements the example device identification repository interface 202, the example manufacturing data interface 204, the example consumer product information database 206, the example panel data interface 208, the example search circuitry 210, the example inference circuitry 212, and the example confidence circuitry 214.

The processor circuitry 512 of the illustrated example includes a local memory 513 (e.g., a cache, registers, etc.). The processor circuitry 512 of the illustrated example is in communication with a main memory including a volatile memory 514 and a non-volatile memory 516 by a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 516 may be implemented by flash memory and/or any other desired type of memory device. Access to the main memory 514, 516 of the illustrated example is controlled by a memory controller 517.

The processor platform 500 of the illustrated example also includes interface circuitry 520. The interface circuitry 520 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 522 are connected to the interface circuitry 520. The input device(s) 522 permit(s) a user to enter data and/or commands into the processor circuitry 512. The input device(s) 522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 524 are also connected to the interface circuitry 520 of the illustrated example. The output device(s) 524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 520 of the illustrated example, thus, typically includes a graphics driver card, a graphics driver chip, and/or graphics processor circuitry such as a GPU.

The interface circuitry 520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 500 of the illustrated example also includes one or more mass storage devices 528 to store software and/or data. Examples of such mass storage devices 528 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 532, which may be implemented by the machine readable instructions of FIGS. 3-4, may be stored in the mass storage device 528, in the volatile memory 514, in the non-volatile memory 516, and/or on a removable non-transitory computer readable storage medium such as a CD or DVD.

Figure 6:
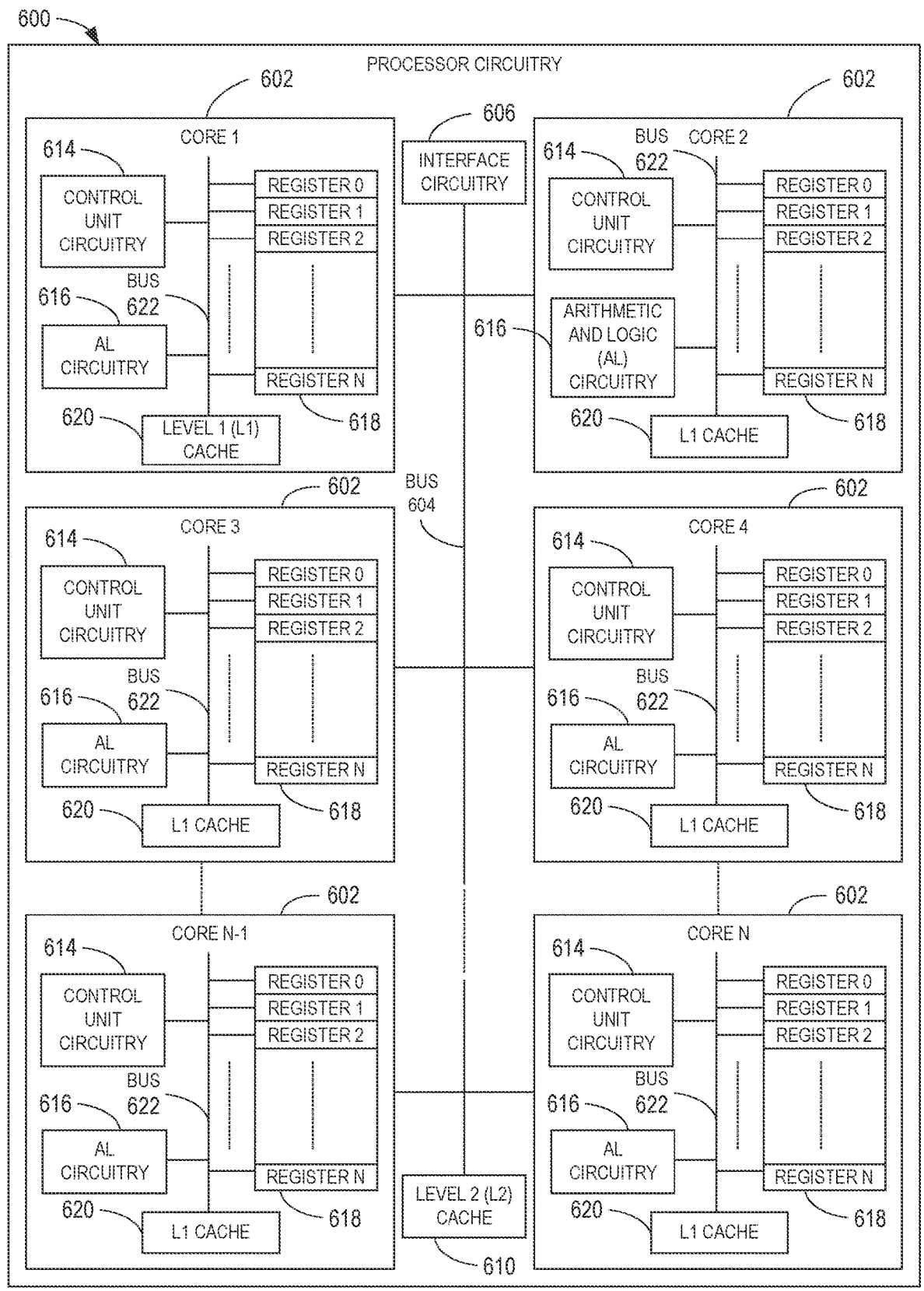
FIG. 6 is a block diagram of an example implementation of the processor circuitry of FIG. 5.

FIG. 6 is a block diagram of an example implementation of the processor circuitry 512 of FIG. 5. In this example, the processor circuitry 512 of FIG. 5 is implemented by a microprocessor 600. For example, the microprocessor 600 may be a general purpose microprocessor (e.g., general purpose microprocessor circuitry). The microprocessor 600 executes some or all of the machine readable instructions of the flowcharts of FIGS. 3-4 to effectively instantiate the device identification server 118 of FIG. 2 as logic circuits to perform the operations corresponding to those machine readable instructions. In some such examples, the vice identification server 118 of FIG. 2 is instantiated by the hardware circuits of the microprocessor 600 in combination with the instructions. For example, the microprocessor 600 may be implemented by multi-core hardware circuitry such as a CPU, a DSP, a GPU, an XPU, etc. Although it may include any number of example cores 602 (e.g., 1 core), the microprocessor 600 of this example is a multi-core semiconductor device including N cores. The cores 602 of the microprocessor 600 may operate independently or may cooperate to execute machine readable instructions. For example, machine code corresponding to a firmware program, an embedded software program, or a software program may be executed by one of the cores 602 or may be executed by multiple ones of the cores 602 at the same or different times. In some examples, the machine code corresponding to the firmware program, the embedded software program, or the software program is split into threads and executed in parallel by two or more of the cores 602. The software program may correspond to a portion or all of the machine readable instructions and/or operations represented by the flowcharts of FIGS. 3-4.

The cores 602 may communicate by a first example bus 604. In some examples, the first bus 604 may be implemented by a communication bus to effectuate communication associated with one(s) of the cores 602. For example, the first bus 604 may be implemented by at least one of an Inter-Integrated Circuit (I2C) bus, a Serial Peripheral Interface (SPI) bus, a PCI bus, or a PCIe bus. Additionally or alternatively, the first bus 604 may be implemented by any other type of computing or electrical bus. The cores 602 may obtain data, instructions, and/or signals from one or more external devices by example interface circuitry 606. The cores 602 may output data, instructions, and/or signals to the one or more external devices by the interface circuitry 606. Although the cores 602 of this example include example local memory 620 (e.g., Level 1 (L1) cache that may be split into an L1 data cache and an L1 instruction cache), the microprocessor 600 also includes example shared memory 610 that may be shared by the cores (e.g., Level 2 (L2 cache)) for high-speed access to data and/or instructions. Data and/or instructions may be transferred (e.g., shared) by writing to and/or reading from the shared memory 610. The local memory 620 of each of the cores 602 and the shared memory 610 may be part of a hierarchy of storage devices including multiple levels of cache memory and the main memory (e.g., the main memory 514, 516 of FIG. 5). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 602 may be referred to as a CPU, DSP, GPU, etc., or any other type of hardware circuitry. Each core 602 includes control unit circuitry 614, arithmetic and logic (AL) circuitry (sometimes referred to as an ALU) 616, a plurality of registers 618, the local memory 620, and a second example bus 622. Other structures may be present. For example, each core 602 may include vector unit circuitry, single instruction multiple data (SIMD) unit circuitry, load/store unit (LSU) circuitry, branch/jump unit circuitry, floating-point unit (FPU) circuitry, etc. The control unit circuitry 614 includes semiconductor-based circuits structured to control (e.g., coordinate) data movement within the corresponding core 602. The AL circuitry 616 includes semiconductor-based circuits structured to perform one or more mathematic and/or logic operations on the data within the corresponding core 602. The AL circuitry 616 of some examples performs integer based operations. In other examples, the AL circuitry 616 also performs floating point operations. In yet other examples, the AL circuitry 616 may include first AL circuitry that performs integer based operations and second AL circuitry that performs floating point operations. In some examples, the AL circuitry 616 may be referred to as an Arithmetic Logic Unit (ALU). The registers 618 are semiconductor-based structures to store data and/or instructions such as results of one or more of the operations performed by the AL circuitry 616 of the corresponding core 602. For example, the registers 618 may include vector register(s), SIMD register(s), general purpose register(s), flag register(s), segment register(s), machine specific register(s), instruction pointer register(s), control register(s), debug register(s), memory management register(s), machine check register(s), etc. The registers 618 may be arranged in a bank as shown in FIG. 5. Alternatively, the registers 618 may be organized in any other arrangement, format, or structure including distributed throughout the core 602 to shorten access time. The second bus 622 may be implemented by at least one of an I2C bus, a SPI bus, a PCI bus, or a PCIe bus.

Each core 602 and/or, more generally, the microprocessor 600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 600 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 7:
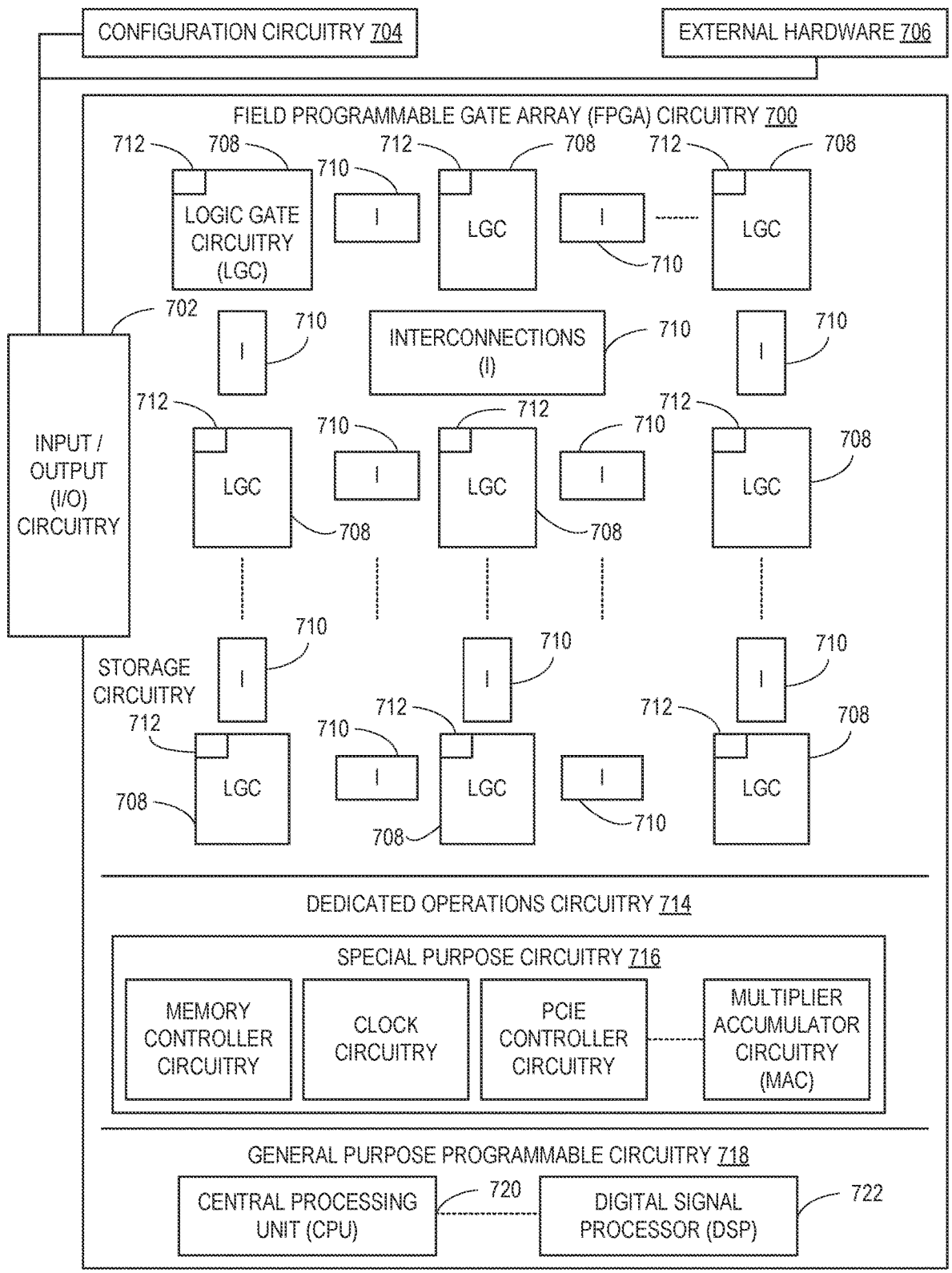
FIG. 7 is a block diagram of another example implementation of the processor circuitry of FIG. 5.

FIG. 7 is a block diagram of another example implementation of the processor circuitry 512 of FIG. 5. In this example, the processor circuitry 512 is implemented by FPGA circuitry 700. For example, the FPGA circuitry 700 may be implemented by an FPGA. The FPGA circuitry 700 can be used, for example, to perform operations that could otherwise be performed by the example microprocessor 600 of FIG. 6 executing corresponding machine readable instructions. However, once configured, the FPGA circuitry 700 instantiates the machine readable instructions in hardware and, thus, can often execute the operations faster than they could be performed by a general purpose microprocessor executing the corresponding software.

More specifically, in contrast to the microprocessor 600 of FIG. 6 described above (which is a general purpose device that may be programmed to execute some or all of the machine readable instructions represented by the flowcharts of FIGS. 3-4 but whose interconnections and logic circuitry are fixed once fabricated), the FPGA circuitry 700 of the example of FIG. 7 includes interconnections and logic circuitry that may be configured and/or interconnected in different ways after fabrication to instantiate, for example, some or all of the machine readable instructions represented by the flowcharts of FIGS. 3-4. In particular, the FPGA circuitry 700 may be thought of as an array of logic gates, interconnections, and switches. The switches can be programmed to change how the logic gates are interconnected by the interconnections, effectively forming one or more dedicated logic circuits (unless and until the FPGA circuitry 700 is reprogrammed). The configured logic circuits enable the logic gates to cooperate in different ways to perform different operations on data received by input circuitry. Those operations may correspond to some or all of the software represented by the flowcharts of FIGS. 3-4. As such, the FPGA circuitry 700 may be structured to effectively instantiate some or all of the machine readable instructions of the flowcharts of FIGS. 3-4 as dedicated logic circuits to perform the operations corresponding to those software instructions in a dedicated manner analogous to an ASIC. Therefore, the FPGA circuitry 700 may perform the operations corresponding to the some or all of the machine readable instructions of FIGS. 3-4 faster than the general purpose microprocessor can execute the same.

In the example of FIG. 7, the FPGA circuitry 700 is structured to be programmed (and/or reprogrammed one or more times) by an end user by a hardware description language (HDL) such as Verilog. The FPGA circuitry 700 of FIG. 7, includes example input/output (I/O) circuitry 702 to obtain and/or output data to/from example configuration circuitry 704 and/or external hardware 706. For example, the configuration circuitry 704 may be implemented by interface circuitry that may obtain machine readable instructions to configure the FPGA circuitry 700, or portion(s) thereof. In some such examples, the configuration circuitry 704 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 706 may be implemented by external hardware circuitry. For example, the external hardware 706 may be implemented by the microprocessor 600 of FIG. 6. The FPGA circuitry 700 also includes an array of example logic gate circuitry 708, a plurality of example configurable interconnections 710, and example storage circuitry 712. The logic gate circuitry 708 and the configurable interconnections 710 are configurable to instantiate one or more operations that may correspond to at least some of the machine readable instructions of FIGS. 3-4 and/or other desired operations. The logic gate circuitry 708 shown in FIG. 7 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 708 to enable configuration of the electrical structures and/or the logic gates to form circuits to perform desired operations. The logic gate circuitry 708 may include other electrical structures such as look-up tables (LUTs), registers (e.g., flip-flops or latches), multiplexers, etc.

The configurable interconnections 710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 708 to program desired logic circuits.

The storage circuitry 712 of the illustrated example is structured to store result(s) of the one or more of the operations performed by corresponding logic gates. The storage circuitry 712 may be implemented by registers or the like. In the illustrated example, the storage circuitry 712 is distributed amongst the logic gate circuitry 708 to facilitate access and increase execution speed.

The example FPGA circuitry 700 of FIG. 7 also includes example Dedicated Operations Circuitry 714. In this example, the Dedicated Operations Circuitry 714 includes special purpose circuitry 716 that may be invoked to implement commonly used functions to avoid the need to program those functions in the field. Examples of such special purpose circuitry 716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 700 may also include example general purpose programmable circuitry 718 such as an example CPU 720 and/or an example DSP 722. Other general purpose programmable circuitry 718 may additionally or alternatively be present such as a GPU, an XPU, etc., that can be programmed to perform other operations.

Although FIGS. 6 and 7 illustrate two example implementations of the processor circuitry 512 of FIG. 5, many other approaches are contemplated. For example, as mentioned above, modern FPGA circuitry may include an onboard CPU, such as one or more of the example CPU 720 of FIG. 7. Therefore, the processor circuitry 512 of FIG. 5 may additionally be implemented by combining the example microprocessor 600 of FIG. 6 and the example FPGA circuitry 700 of FIG. 7. In some such hybrid examples, a first portion of the machine readable instructions represented by the flowcharts of FIG. 3-4 may be executed by one or more of the cores 602 of FIG. 6, a second portion of the machine readable instructions represented by the flowcharts of FIGS. 3-4 may be executed by the FPGA circuitry 700 of FIG. 7, and/or a third portion of the machine readable instructions represented by the flowcharts of FIGS. 3-4 may be executed by an ASIC. It should be understood that some or all of the device identification server 118 of FIG. 2 may, thus, be instantiated at the same or different times. Some or all of the circuitry may be instantiated, for example, in one or more threads executing concurrently and/or in series. Moreover, in some examples, some or all of the device identification server 118 of FIG. 2 may be implemented within one or more virtual machines and/or containers executing on the microprocessor.

In some examples, the processor circuitry 512 of FIG. 5 may be in one or more packages. For example, the microprocessor 600 of FIG. 6 and/or the FPGA circuitry 700 of FIG. 7 may be in one or more packages. In some examples, an XPU may be implemented by the processor circuitry 512 of FIG. 5, which may be in one or more packages. For example, the XPU may include a CPU in one package, a DSP in another package, a GPU in yet another package, and an FPGA in still yet another package.

Figure 8:
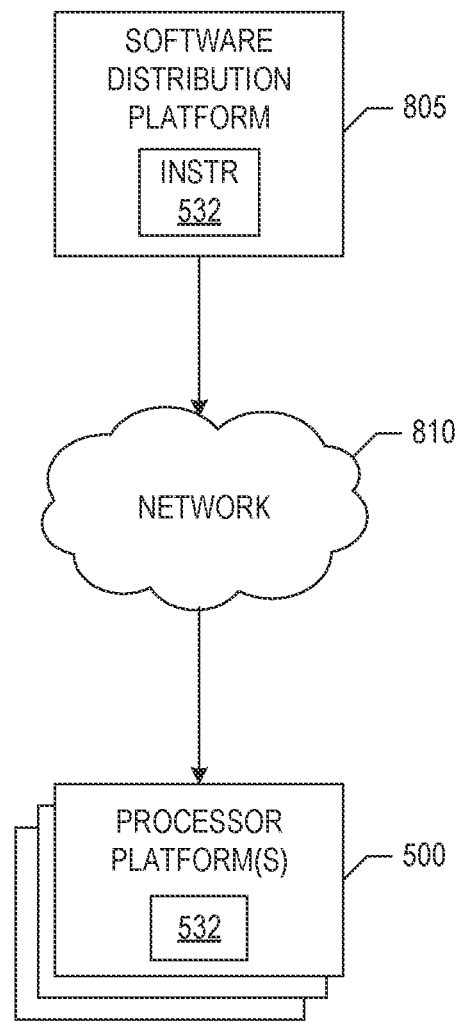
FIG. 8 is a block diagram of an example software distribution platform (e.g., one or more servers) to distribute software (e.g., software corresponding to the example machine readable instructions of FIGS. 3-4) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 805 to distribute software such as the example machine readable instructions 532 of FIG. 5 to hardware devices owned and/or operated by third parties is illustrated in FIG. 8. The example software distribution platform 805 may be implemented by any computer server, data facility, cloud service, etc., capable of storing and transmitting software to other computing devices. The third parties may be customers of the entity owning and/or operating the software distribution platform 805. For example, the entity that owns and/or operates the software distribution platform 805 may be a developer, a seller, and/or a licensor of software such as the example machine readable instructions 532 of FIG. 5. The third parties may be consumers, users, retailers, OEMs, etc., who purchase and/or license the software for use and/or re-sale and/or sub-licensing. In the illustrated example, the software distribution platform 805 includes one or more servers and one or more storage devices. The storage devices store the machine readable instructions 532, which may correspond to the example machine readable instructions 300 of FIGS. 3-4, as described above. The one or more servers of the example software distribution platform 805 are in communication with an example network 810, which may correspond to any one or more of the Internet and/or any of the example networks 106, 110 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 532 from the software distribution platform 805. For example, the software, which may correspond to the example machine readable instructions 300 of FIGS. 3-4, may be downloaded to the example processor platform 500, which is to execute the machine readable instructions 532 to implement the device identification server 118. In some examples, one or more servers of the software distribution platform 805 periodically offer, transmit, and/or force updates to the software (e.g., the example machine readable instructions 532 of FIG. 5) to ensure improvements, patches, updates, etc., are distributed and applied to the software at the end user devices.

From the foregoing, it will be appreciated that example systems, methods, apparatus, and articles of manufacture have been disclosed that identify electronic devices. Disclosed systems, methods, apparatus, and articles of manufacture improve the efficiency of using a computing device by identifying devices based on device identification information that is not previously stored in a database (e.g., by inferring device information). Disclosed systems, methods, apparatus, and articles of manufacture are accordingly directed to one or more improvement(s) in the operation of a machine such as a computer or other electronic and/or mechanical device.

It is noted that this patent claims priority from Provisional Patent Application No. 63/266,318, which was filed on Dec. 31, 2021, and is hereby incorporated by reference in its entirety.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An audience measurement system comprising:
a device identification repository storing device identification information associated with device information, wherein the device identification repository stores first device identification information and respective device information for a first media presentation device that is located in a first media presentation location, and wherein the first device identification information and respective device information are collected during setup of a first audience measurement meter at the first media presentation location;
a second audience measurement meter configured to capture a network communication transmitted on a local area network between an unknown media presentation device and a network device that are located at a second media presentation location, wherein capturing the network communication comprises capturing a media access control (MAC) address of the unknown media presentation device;
a metering data collection server configured to receive the MAC address from the second audience measurement meter; and
a device identification server configured to perform a set of acts comprising:
  receiving, from the metering data collection server via a network, a query comprising the MAC address, wherein the MAC address comprises a manufacturer identifier and a device identifier;
  identifying a first entry in the device identification repository that has a same manufacturer identifier as the MAC address and is numerically closest to the MAC address;
  identifying a second entry in the device identification repository that is numerically closest to the MAC address in an opposite direction as a direction from the MAC address to the first entry;
  determining that the first entry and the second entry are both associated with a common device type; and
  based on the determining, outputting, to the metering data collection server via the network, the common device type as a response to the query.

2. The audience measurement system of claim 1, wherein the common device type includes a device model name.

3. The audience measurement system of claim 1, wherein the set of acts further comprises assigning a confidence value to the response to the query.

4. The audience measurement system of claim 1, wherein the device identification server comprises a panel data interface for collecting the first device identification information and respective device information for the first media presentation device.

5. The audience measurement system of claim 4, wherein the panel data interface comprises an application programming interface.

6. The audience measurement system of claim 1, wherein:
the second audience measurement meter is located at a second media presentation location;
the metering data collection server is further configured to detect a fault based on a determination that the common device type is not recognized for the second media presentation location.

7. The audience measurement system of claim 6, wherein detection of the fault triggers an alert.

8. A computer-implemented method comprising:
  capturing, by a first audience measurement meter, a network communication transmitted on a local area network between an unknown media presentation device and a network device, wherein capturing the network communication comprises capturing a media access control (MAC) address of the unknown media presentation device;
  receiving, by a metering data collection server from the first audience measurement meter, the MAC address;
  obtaining, by a device identification server from the metering data collection server via a network, a query comprising the MAC address, wherein the MAC address comprises a manufacturer identifier and a device identifier;
  identifying a first entry in a device identification repository that has a same manufacturer identifier as the MAC address and is numerically closest to the MAC address, wherein the device identification repository stores device identification information associated with device information, wherein the device identification repository stores first device identification information and respective device information for a second media presentation device that is located in a second media presentation location, and wherein the first device identification information and respective device information are collected during setup of a second audience measurement meter at the second media presentation location;
  identifying a second entry in the device identification repository that is numerically closest to the MAC address in an opposite direction as a direction from the MAC address to the first entry;
  determining that the first entry and the second entry are both associated with a common device type; and
  based on the determining, outputting, to the metering data collection server via the network, the common device type as a response to the query.

9. The method of claim 8, wherein the common device type includes a device model name.

10. The method of claim 8, further comprising assigning a confidence value to the response to the query.

* * * * *